US008732226B2

(12) United States Patent
Abdallah et al.

(10) Patent No.: US 8,732,226 B2
(45) Date of Patent: May 20, 2014

(54) INTEGER ROUNDING OPERATION

(75) Inventors: Mohammad Abdallah, Folsom, CA (US); Chad D. Hancock, Beaverton, OR (US); Kwok W. Lui, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 984 days.

(21) Appl. No.: 11/447,344

(22) Filed: Jun. 6, 2006
(Under 37 CFR 1.47)

(65) Prior Publication Data

US 2007/0282938 A1 Dec. 6, 2007

(51) Int. Cl.
*G06F 7/38* (2006.01)
*G06F 7/499* (2006.01)

(52) U.S. Cl.
CPC ........ *G06F 7/49947* (2013.01); *G06F 7/49915* (2013.01)
USPC .......................................... 708/497; 708/498

(58) Field of Classification Search
USPC .......................... 708/204–205, 495, 497–499
See application file for complete search history.

(56) References Cited

U.S. PATENT DOCUMENTS

| 5,258,943 | A | * | 11/1993 | Gamez et al. | 708/497 |
|---|---|---|---|---|---|
| 5,812,439 | A | * | 9/1998 | Hansen | 708/497 |
| 6,275,239 | B1 | * | 8/2001 | Ezer et al. | 345/473 |
| 6,282,554 | B1 | | 8/2001 | Abdallah et al. | |
| 6,418,529 | B1 | | 7/2002 | Roussel | |
| 6,502,115 | B2 | | 12/2002 | Abdallah et al. | |
| 6,510,446 | B1 | * | 1/2003 | Fukagawa | 708/497 |
| 6,529,930 | B1 | * | 3/2003 | Sazzad et al. | 708/552 |
| 6,879,992 | B2 | * | 4/2005 | Zohar | 708/550 |
| 6,965,906 | B1 | * | 11/2005 | Dhablania | 708/204 |
| 7,225,323 | B2 | * | 5/2007 | Siu et al. | 712/222 |
| 7,529,912 | B2 | * | 5/2009 | Henry et al. | 712/210 |
| 2004/0034757 | A1 | * | 2/2004 | Gochman et al. | 711/219 |
| 2004/0268094 | A1 | * | 12/2004 | Abdallah et al. | 712/221 |

* cited by examiner

*Primary Examiner* — Chuong D Ngo
*Assistant Examiner* — Matthew Sandifer
(74) *Attorney, Agent, or Firm* — Blakely, Sokoloff, Taylor & Zafman LLP

(57) ABSTRACT

Systems, methods, processors, media, and other embodiments associated with integer rounding a floating point number in one micro-operation (uop) are described. One system embodiment includes a memory to store an integer rounding floating point instruction and a processor to perform the integer rounding floating point instruction. The processor may include a floating point unit that includes circuits and/or logics that integer round the floating point number.

26 Claims, 10 Drawing Sheets

INTEGER ROUNDING OPERATION

TECHNICAL FIELD

Embodiments of the invention relate to the field of microprocessors and computer systems. More particularly, at least one embodiment of the invention relates to a technique to round floating point numbers.

BACKGROUND

In computer systems, floating point numbers may be rounded up or rounded down to a nearest whole number. For example, a floating point number 1.23 may be rounded up to 2.0 or rounded down to 1.0. Rounding a floating point number to a nearest whole number may be referred to as "integer rounding". Some systems may require multiple operations or instructions to integer round floating point numbers. For example, in order to generate an integer rounded number from a floating point number, some systems may convert the floating point number into an integer representing a rounded version of the floating point number in a first operation, and in a second operation convert the integer number into a floating point value representing the integer rounded version of the floating point number. Performing multiple operations or instructions to integer round floating point numbers may inhibit processor performance, increase power consumption, and increase instruction complexity, among other things.

BRIEF DESCRIPTION OF THE DRAWINGS

The accompanying drawings, which are incorporated in and constitute a part of the specification, illustrate various system embodiments, method embodiments, and other embodiments of various aspects of the invention. It will be appreciated that the illustrated element boundaries (e.g., boxes, groups of boxes, or other shapes) in the figures represent one example of the boundaries. One of ordinary skill in the art will appreciate that unless otherwise stated one element may be designed as multiple elements, multiple elements may be designed as one element, an element shown as an internal component of another element may be implemented as an external component and vice versa, and so on. Furthermore, elements may not be drawn to scale.

DETAILED DESCRIPTION

Figure 1:
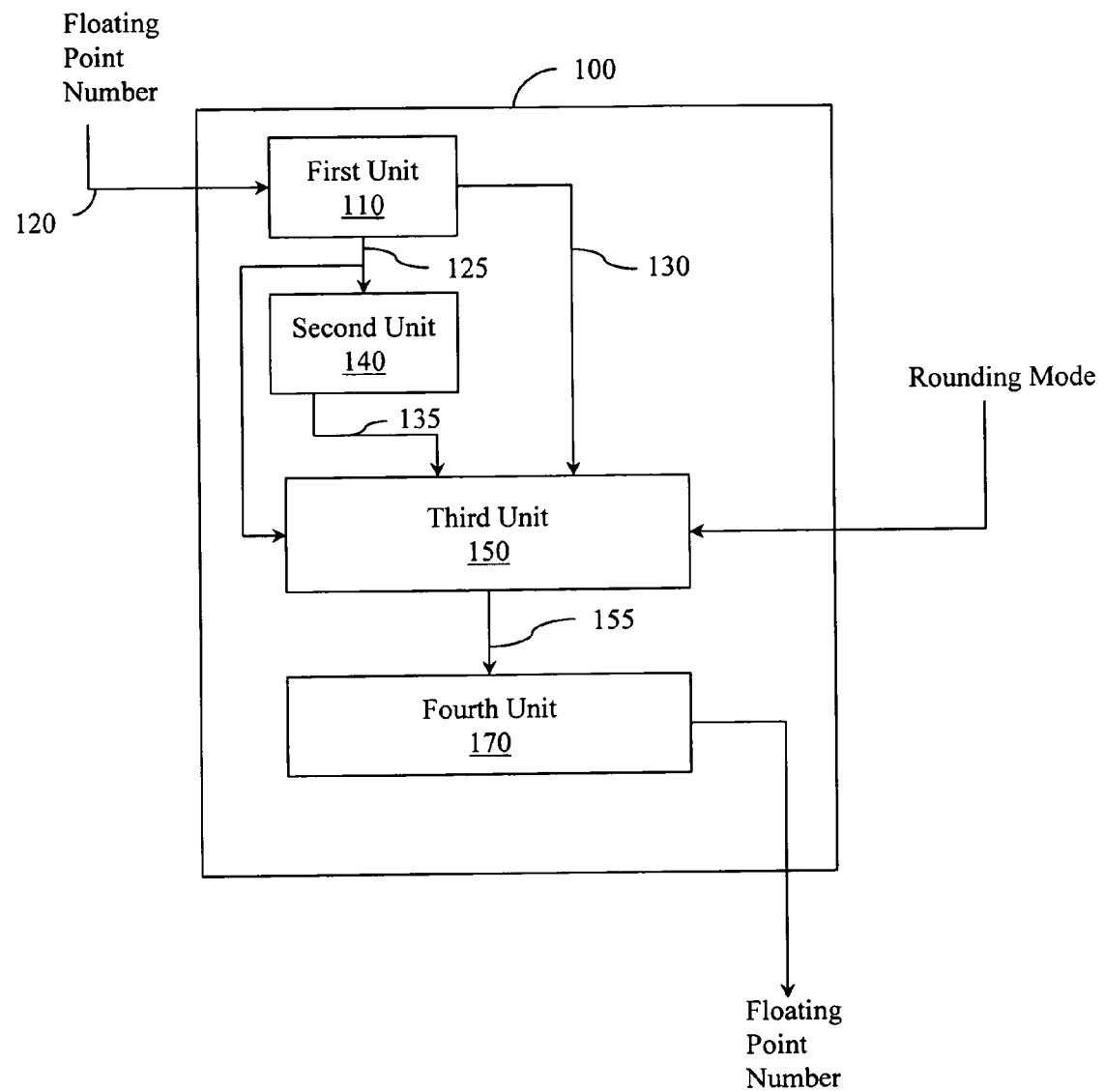
FIG. 1 is a block diagram illustrating an organization of processing logic in which at least some aspects of at least one embodiment of the invention may be performed.

In one embodiment of the invention, a floating-point number may be integer rounded in one operation, such as a micro-operation (uop) or instruction. Integer rounding a floating-point number in one operation, (e.g., uop), according to at least one embodiment, instead of multiple instructions or uops may increase processing throughput, efficiency, and performance while reducing processing power consumption and latency.

In one embodiment, a processor or other integrated circuit may include and/or be associated with hardware circuits (e.g., CMOS (complimentary metal oxide silicon) circuits), software, micro-code, and so on, to perform various aspects of embodiments of the invention. For example, in one embodiment, a processor having floating point arithmetic logic may perform integer rounding operations by executing only one operation (e.g., uop, instruction) generically referred to herein as a "uop".

In one embodiment, floating point add unit hardware may be organized in two or more logical paths to facilitate performing two or more arithmetic operations (e.g., float to int conversion) concurrently or otherwise in parallel. For example, a first path, an alignment path, can produce a first value (e.g., rounded integer value) while a second path, a normalization path, can produce a second value (e.g., floating point version of rounded integer value). In some systems these two paths would be traversed in two passes (e.g., two uops). In one embodiment of the invention, additional hardware (e.g., circuit) may be added to a floating point add unit. This additional hardware may facilitate selecting between results produced by different two logical paths and may facilitate converting the selected result to a desired format (e.g., floating point). Thus, in one embodiment, floating point add unit hardware may integer round in one uop.

In one embodiment of the invention, integer rounding may be performed by a floating point unit that includes both an arithmetic logic (e.g., adder), an alignment logic, and a rounding logic. In one embodiment, the adder may be available to produce a rounded number used by different embodiments described herein. For example, in one embodiment, the adder may produce a rounded-up (+1) integer version of a floating point number and an alignment path may produce a rounded-down (+0) integer version. In one embodiment, a selection logic may select which, if either, of the integer versions to convert back to floating point. In some cases, the selection logic may select the original floating point number as an output. Using the floating point unit hardware to produce different possible rounded integers, to select between the integers, and to convert the selected integer back to floating point facilitates integer rounding a floating point number in one uop.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Machine-readable medium", as used herein, refers to a medium that participates in directly or indirectly providing signals, instructions and/or data that can be read by a machine (e.g., computer). A machine-readable medium may take forms, including, but not limited to, non-volatile media (e.g., optical disk, magnetic disk), volatile media (e.g., semiconductor memory, dynamic memory), and transmission media (e.g., coaxial cable, copper wire, fiber optic cable, electromagnetic radiation). Common forms of machine-readable mediums include floppy disks, hard disks, magnetic tapes, random access memory (RAM), read only memory (ROM), compact disk ROM (CD-ROM), carrier waves/pulses, and so on. Signals used to propagate instructions or other software over a network, like the Internet, can be considered a "machine-readable medium."

"Logic", as used herein, includes but is not limited to hardware, firmware, software and/or combinations thereof to perform a function(s) or an action(s), and/or to cause a function or action from another logic, method, and/or system. Logic may include discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. Where multiple logical logics are described, it may be possible in some examples to incorporate the multiple logical logics into one physical logic. Similarly, where a single logical logic is described, it may be possible in some examples to distribute that single logical logic between multiple physical logics.

"Signal", as used herein, includes but is not limited to, electrical signals, optical signals, analog signals, digital signals, or other means that can be received, transmitted and/or detected.

FIG. 1 illustrates an organization of processing logic in which some aspects of at least one embodiment of the invention may be performed. The processing logic may be organized, for example, in an integrated circuit 100. In one example, integrated circuit 100 may integer round a floating point number in one uop. The integrated circuit 100 may be embodied, for example, in a floating point unit, in a floating point add unit, in a portion of a processor, and so on. In one embodiment, data representing the integrated circuit 100 may be stored on an article of manufacture (e.g., a machine-readable medium). The integrated circuit 100 may include a first unit 110 to convert a floating point number input on lines 120 to a first integer number. The first unit 110 may also manipulate a conversion signal and provide the conversion signal on line 130. Manipulating the conversion signal may include, for example, establishing a value, updating a value, and so on. The conversion signal may indicate, for example, whether any precision is lost when the first unit 110 converts the input floating point number to an integer.

Floating point numbers may be represented by a set of signals. For a general description of one example set of signals, see the IEEE Standard for Binary Floating Point Arithmetic, IEEE Std. 754-1985, published Aug. 12, 1985. In one embodiment, a floating point number may be represented using three fields: a mantissa (M) field, an exponent (E) field, and a sign (S) field. The mantissa may store the fractional part of a floating point number. This fractional part may be normalized so that the most significant digit in the mantissa is non-zero. Thus, the mantissa may assume a leading one. The exponent may store a power of two to which the mantissa is raised. The exponent may be stored in a biased format. The sign bit may indicate whether the represented floating point number is positive or negative.

In one embodiment, integrated circuit 100 may be part of a floating point add unit. In one embodiment, a single floating point number may be provided to the integrated circuit 100. However, in another embodiment, two floating point numbers may be provided to the integrated circuit 100. Thus, in one embodiment, a first value (e.g., binary number) provided to the integrated circuit 100 may hold a floating point number to integer round while a second value (e.g., binary number) may be used to facilitate integer rounding the first value using only one uop. For example, the second value may hold values useful for identifying exceptional cases (e.g., integer overflow).

Floating point numbers may be normalized so that one and only one non-zero number appears immediately to the left of a virtual decimal point. Integer numbers may be aligned on the right so that the virtual decimal point appears as far to the right as possible. Thus, in one embodiment, converting a value from floating point format to integer format involves right shifting bits of the mantissa. Similarly, in one embodiment, converting from integer format back to floating point format involves left shifting bits of a mantissa. In one embodiment, right shifting and left shifting may be performed by alignment and normalization logics in a floating point add unit.

In one embodiment, the integrated circuit 100 includes a first unit 110 (e.g., an alignment logic). In some systems, the alignment logic may be used to align two floating point numbers and to provide the aligned floating point numbers to an adder. In one embodiment of the invention, when the integrated circuit 100 is used to integer round a floating point number in one uop, the alignment logic can re-align an input floating point number into a corresponding integer representation by right shifting bits in the floating point mantissa. The integer representation may be provided on lines 125. During some conversions from float to integer, a digit(s) may be lost from the floating point mantissa during right shifting. The conversion signal provided on lines 130 may indicate whether any digits were lost during right shifting of the floating point mantissa. In one embodiment, the state of the conversion signal provided on lines 130 may indicate states associated with aligning the floating point mantissa into an integer mantissa. These states may include, for example, a guard bit state, a round bit state, a sticky bit state, and a least significant bit state. In one embodiment, state information may be stored in a data store (e.g., register, flip flop).

In one embodiment, the integrated circuit 100 may also include a second unit 140 (e.g., adder). The second unit may add a value to the integer number produced by the first unit 110 to produce a second integer number. The second integer number may be provided on lines 135. The value added to the integer number by the adder may be, for example, an integer one. Thus, the second integer number may be a rounded-up version of the integer produced by the first unit 110.

The integrated circuit 100 may also include a third unit 150 (e.g., multiplexer) to place a result integer on lines 155. The result integer may be selected from the first integer number on 125 and the second integer number on 135. The selection may be based, at least in part, on a rounding mode and the state of the conversion signal on lines 130. In one embodiment, the third unit 150 operates in parallel with the second unit 140. For example, while the second unit 140 computes the second integer number, the third unit 150 can decide whether the first integer number on 125 or the second integer number on 135 will be selected as the result integer 155.

In one embodiment, where the second unit 140 is an adder, the third unit 150 may be an adder bypass multiplexer. The adder bypass multiplexer may facilitate selecting as the result integer either the first integer number produced by the first unit 110 or the second integer number produced by the second unit 140. In one embodiment, the adder bypass multiplexer may select from different available integer representations based on the rounding mode, on digit loss information, and so on. The rounding mode may identify one of a variety of manners in which a floating point number can be rounded. For example, a floating point number may be rounded using a truncation (also known as "chop") technique that rounds a floating point number towards zero. A floating point number may also be rounded using a round to the nearest integer technique, a floor technique (round towards negative infinity), and a ceiling technique (round towards positive infinity). Truncation drops the fractional portion of a floating point number. Rounding to the nearest integer selectively rounds the floating point number up or down. Rounding towards negative infinity causes the floating point number to be decreased to the next lower integer. Rounding towards positive infinity causes the floating point number to be increased to the next higher integer.

The integrated circuit 100 may also include additional elements. For example, the integrated circuit 100 may include a fourth unit 170 to process into an output floating point number the result integer selected by the third unit 150. The output floating point number may be an integer rounded version of the input floating point number. In one embodiment, with the third unit 150 operating in parallel with the second unit 140, the output floating point number may be produced from the input floating point number in one micro-operation (uop).

In one embodiment, the fourth unit 170 may include both a normalization logic to normalize the result integer on 155 into the output floating point number and a rounding logic to selectively renormalize the output floating point number. The output floating point number may be renormalized if, for example, an addition operation in the second unit 140 caused a carry condition.

Figure 2:
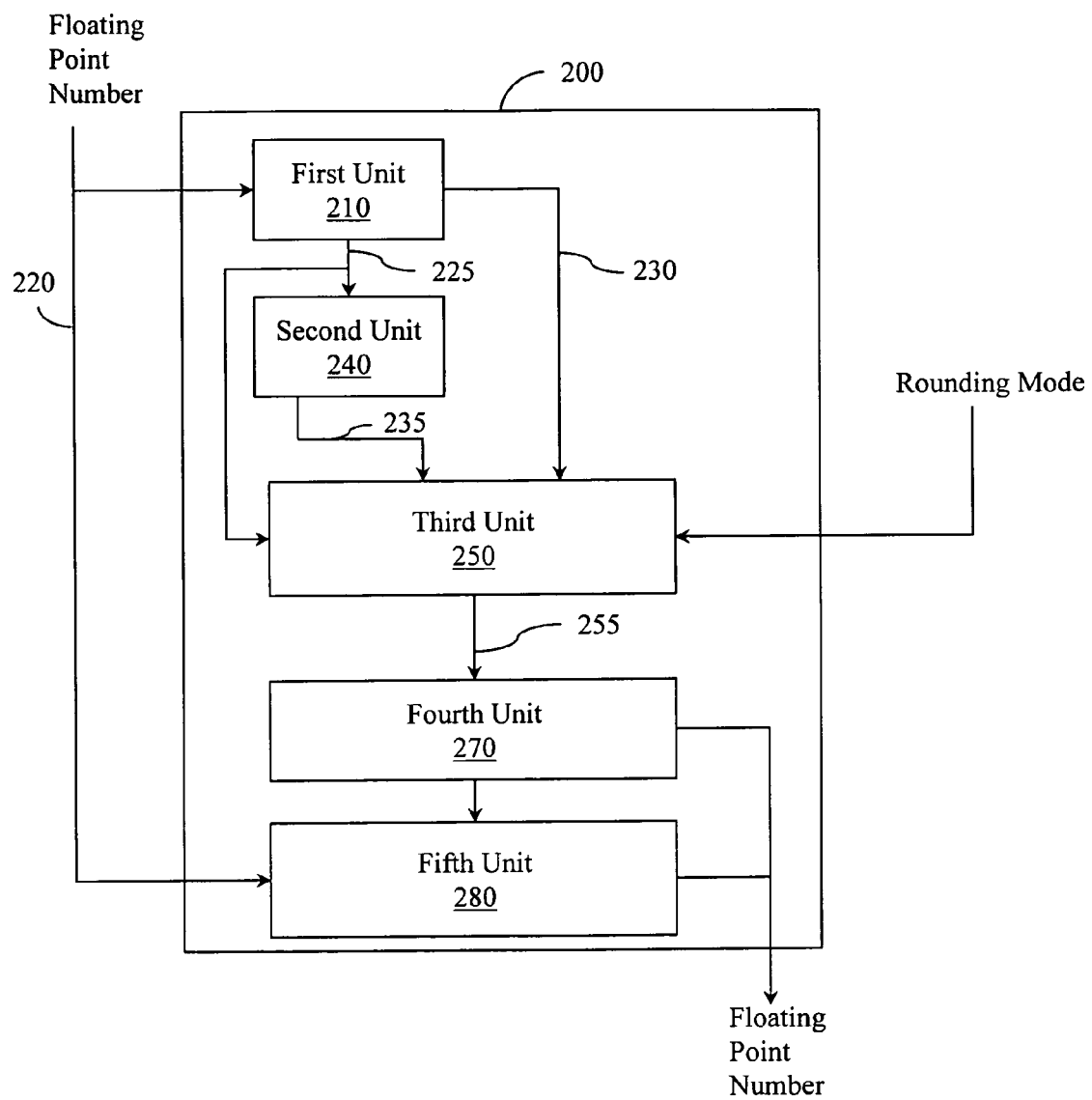
FIG. 2 is a block diagram illustrating an organization of processing logic in which at least some aspects of at least one embodiment of the invention may be performed.

FIG. 2 is a block diagram illustrating an organization of processing logic in which at least some aspects of at least one embodiment of the invention may be performed. In one embodiment, the processing logic may be arranged in an integrated circuit 200. Integrated circuit 200 has some elements that are similar to those described in connection with integrated circuit 100 (FIG. 1). For example, integrated circuit 200 includes a first unit 210, a second unit 240, a third unit 250, and a fourth unit 270. Although the third unit 250 can select between two integer versions of an input floating point number, there may be situations where neither integer version is converted back to floating point format and provided as an output. For example, there may be an overflow condition created in the first unit 210. Thus, in one embodiment, the integrated circuit 200 may include a fifth unit 280 to provide the input floating point number as the output floating point number when the conversion performed by the first unit 210 produces the integer overflow.

By way of illustration, observe that in one floating point format a 24-bit floating point mantissa may be rounded to a 32-bit integer mantissa (e.g., for single precision) and a 53-bit mantissa may be rounded to a 64-bit integer mantissa (e.g., for double precision). Now consider the following example:

Integer overflow=1.00000000000000000000000x
$2^{32}$=4294967296

Last possible number before integer overflow=1.11111111111111111111111x
$2^{31}$=4294967040

As the last possible number before integer overflow is already an integer, integrated circuit 200 would not perform rounding for this input and output floating point number would be input floating point number.

Figure 3:
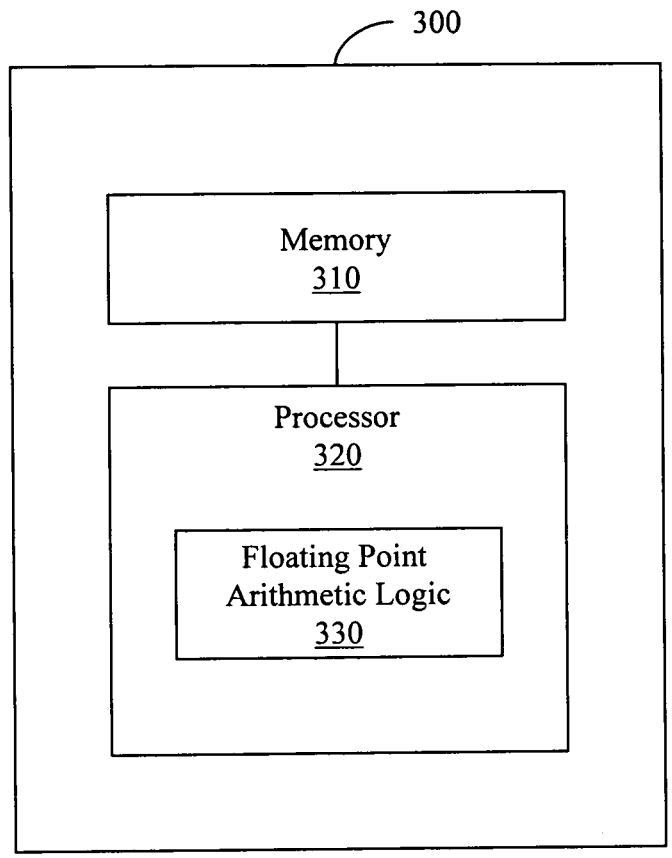
FIG. 3 illustrates a computer system in which at least some aspects of at least one embodiment of the invention may be performed.

FIG. 3 illustrates a computer system 300 in which at least some aspects of at least one embodiment of the invention may be performed. Thus, computer system 300 may integer round floating point numbers according to one embodiment of the invention. In one embodiment, system 300 includes a memory 310 to store an integer rounding floating point instruction and a processor 320 to execute the integer rounding floating point instruction. The integer rounding floating point instruction may be provided to computer system 300 on, for example, a bus. The processor 320 may include a floating point arithmetic logic 330 to perform the instruction to integer round a floating point value. The floating point arithmetic logic 330 may perform the instruction in one operation (e.g., uop). Floating point arithmetic logic 330 may provide the integer rounded floating point value as a result. The result may be provided, for example, on a bus.

In one embodiment, system 300 may also include an audio device coupled to processor 320. Thus, system 300 may also include an audio logic to control the audio device to produce a sound based, at least in part, on the rounded floating point value provided by the floating point arithmetic logic 330.

In one embodiment, the instruction to be performed by processor 320 may be stored on a machine-readable medium. When the instruction is executed by a machine (e.g., computer) it may cause the machine to perform a method. The method may include aligning a floating point mantissa to create an integer mantissa and to establish a precision loss signal based on the aligning. For example, if bits are right shifted out of the floating point mantissa, the precision loss signal may indicate this event.

In one embodiment, the method may also include producing both a pre-rounded integer mantissa and an ungrounded integer mantissa from the integer mantissa. Thus, two versions of an integer produced from an input floating point number may be available. Thus, in one embodiment, the method may include selecting an intermediate integer mantissa from the two versions (e.g., pre-rounded integer mantissa, ungrounded integer mantissa). The selection may be based, for example, on the precision loss signal and a desired rounding mode.

In one embodiment, producing the pre-rounded integer mantissa and selecting the intermediate integer mantissa may occur at least partially in parallel during a single pass through a floating point add unit. The single pass may be taken in response to a single operation (e.g., uop). For example, while the pre-rounded integer mantissa is being produced, a determination as to which of the pre-rounded or the ungrounded integer mantissa to select may be made. In one embodiment, the method may also include normalizing the intermediate integer mantissa into an output floating point mantissa representing an integer rounded version of the floating point mantissa.

In one embodiment, the instruction may be a ROUNDPS instruction that receives three arguments. A first argument may carry a value retrieved, for example, from a 128-bit register (e.g., xmm1). This value may be referred to as Src1 (e.g., source input one). A second argument may carry a value produced from a value retrieved from a second 128-bit register (e.g., xmm2). In one example, the second argument will store xmm2/m128. The exponent of the second argument may be forced with a desired value to facilitate identifying special cases and/or to facilitate rounding. For example, the exponent of the second argument may be forced with a constant that is the difference between the J-bit position and the integer least significant bit (LSB) position. Additionally, the mantissa of the second argument may have its integer least significant bit set to 1. A third argument may carry an immediate field that stores, for example, rounding mode information. While three arguments are illustrated in a certain order, it is to be appreciated that in other embodiments a greater and/or lesser number of arguments may be provided in different orders.

One instruction embodiment may be a packed/scalar version of an integer rounding instruction. Another instruction embodiment may be a single/double precision version of an integer rounding instruction. In different embodiments, the instruction may receive different inputs. For example, the instruction may receive as inputs four packed single precision numbers, two packed double precision numbers, one single precision number, one double precision number, and so on.

Figure 4:
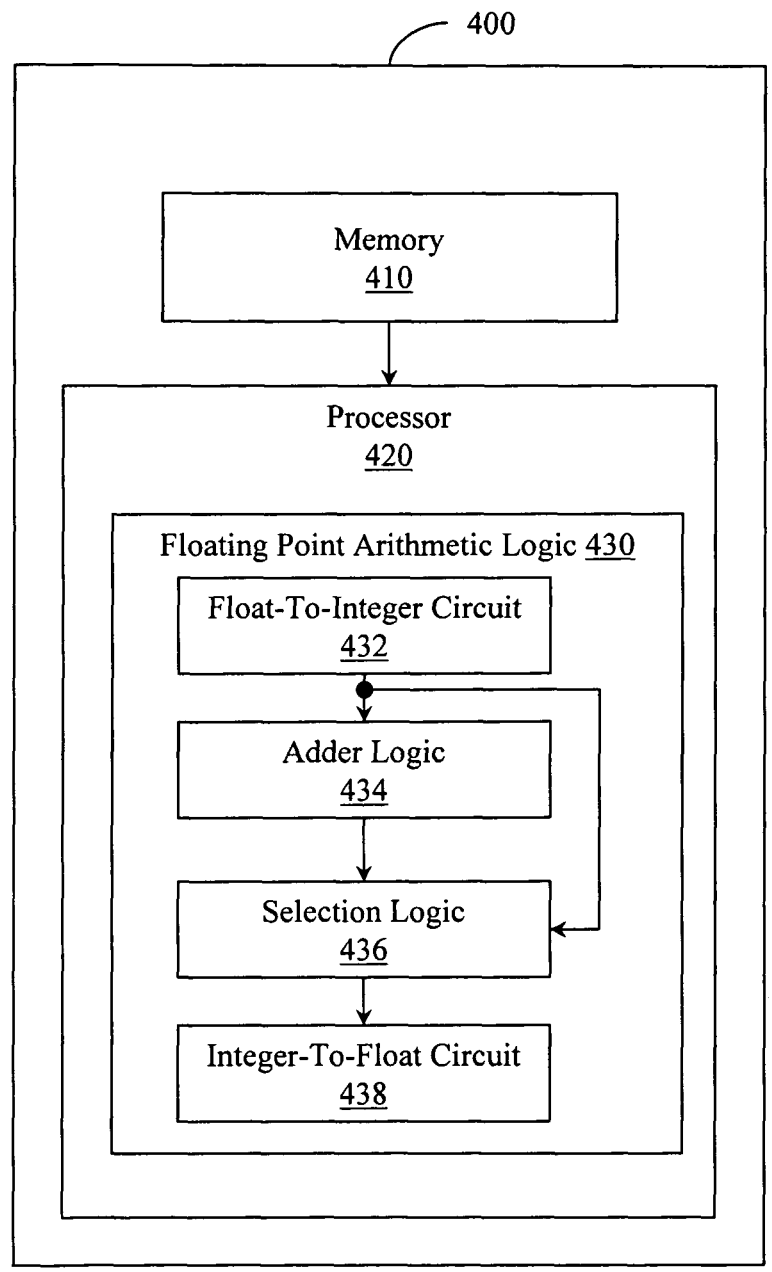
FIG. 4 illustrates floating point logic within a computer system in which at least some aspects of at least one embodiment of the invention may be performed.

FIG. 4 illustrates floating point logic within a computer system 400 in which at least some aspects of at least one embodiment of the invention may be performed. Thus computer system 400 may integer round floating point numbers according to one embodiment of the invention. The computer system 400 includes some components like those described in connection with the computer system 300 (FIG. 3). For example, the computer system 400 includes a memory 410 and a processor 420 that includes a floating point arithmetic logic 430.

FIG. 4 illustrates several components in the floating point arithmetic logic 430. For example, in one embodiment the floating point arithmetic logic 430 includes a float-to-integer circuit 432 to transition a received floating point value to a first integer value. The transition may involve, for example, right shifting bits in an alignment multiplexer. In one embodiment, the floating point arithmetic logic 430 may also include an adder logic 434 to round up the first integer value from circuit 432 to produce a second integer value. In one embodiment, the floating point arithmetic logic 430 may also include a selection logic 436 to choose one of the first integer value (from circuit 432) and the second integer value (from adder logic 434) as a result integer. In one example, the adder logic 434 and the selection logic 436 may operate in parallel.

In one embodiment the floating point arithmetic logic 430 may also include an integer-to-float circuit 438 to transition the result integer value to a result floating point value. The result floating point value that is produced is a rounded version of the received floating point value. Transitioning the result integer value to the result floating point value may include, for example, left shifting bits in a normalization logic and/or rounding logic.

Figure 5:
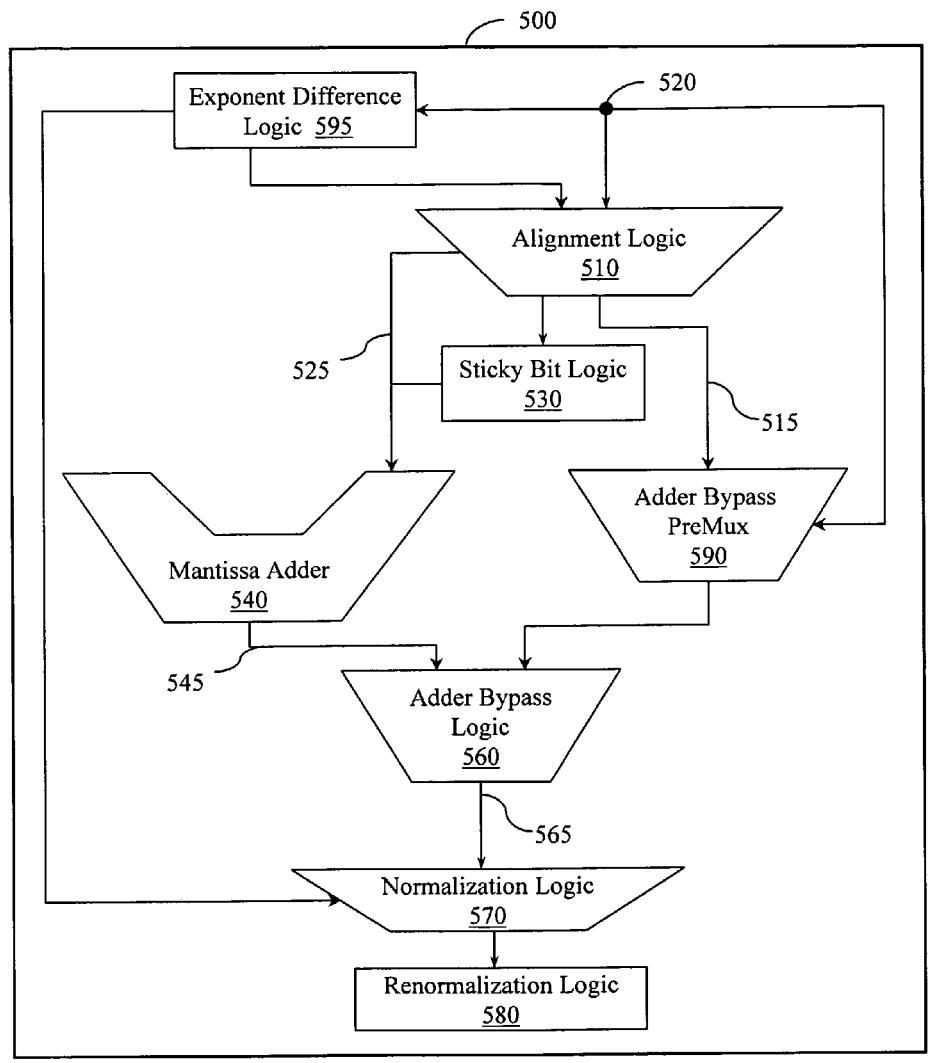
FIG. 5 illustrates processing logic in which at least some aspects of at least one embodiment of the invention may be performed.

FIG. 5 illustrates processing logic in which at least some aspects of at least one embodiment of the invention may be performed. The processing logic may be arranged in an apparatus 500 according to one embodiment of the invention. In one embodiment, the apparatus 500 may include an alignment logic 510 to align a digital representation of an original floating point number into a digital representation of an integer number. The integer number is output on signal lines 515 and 525. As described above, floating point numbers may be represented in different formats. For example, floating point numbers may be represented by a set of signals describing a sign, a mantissa, and an exponent. Thus, the original floating point number input to apparatus 500 may be provided as a set of signals on input signal lines 520.

In one embodiment, the apparatus 500 may also include a sticky bit logic 530 to establish a value for a sticky bit. The sticky bit may hold a value that indicates whether a bit loss occurred when the alignment logic 510 aligned the digital representation of the original floating point number into the digital representation of the integer number. In one example, the sticky bit may be stored in a register.

In one embodiment, the apparatus 500 may also include a mantissa adder 540 to produce on signal lines 545 a digital representation of an updated integer number from the digital representation of the integer number. While only a single input is illustrated as being provided to the mantissa adder 540, it is to be appreciated that the mantissa adder 540 may receive two inputs. In one embodiment, the second input may be a constant value (e.g., integer one) that facilitates producing a rounded-up version of the digital representation of the integer number on signal lines 525.

As described above, in one embodiment the alignment logic 510 produces one digital representation of an integer on lines 515 and 525. In one embodiment, the mantissa adder 540 produces a second digital representation of an integer on lines 545. Thus, two digital representations of integer numbers are available. These may be referred to as a +0 version (lines 515) and a +1 version (lines 545). In one embodiment, the +0 version may be provided to and passed through an adder bypass pre-multiplexer 590. The apparatus 500 may therefore include an adder bypass logic 560 to select one of the available representations (e.g., +0, +1) as a digital representation of a rounded integer number, which is output on signal lines 565. The selection may be based, at least in part, on a rounding mode and the sticky bit. In one embodiment, the mantissa adder 540 and the adder bypass logic 560 may operate in parallel. For example, while mantissa adder 540 is producing the +1 version, the adder bypass logic 560 may be deciding whether to select the +0 or the +1 version.

In one embodiment, the adder bypass logic 560 may be a multiplexer that can receive rounding mode bits and alignment bits (e.g., a guard bit, a sign bit, a least significant bit, a rounding bit, a sticky bit). The rounding mode bits may identify a rounding mode (e.g., truncate, nearest integer, floor, ceiling). Thus, in one embodiment, the adder bypass logic 560 may determine a digital representation to select based, at least in part, on evaluating states described by the rounding mode bits and the alignment bits.

In one embodiment, apparatus 500 includes a normalization logic 570 to normalize the digital representation of the rounded integer number into a digital representation of a first rounded floating point result. In one embodiment, both the alignment logic 510 and the normalization logic 570 may interact with an exponent difference logic 595. For example, the alignment logic 510 may be a right shifter controlled, at least in part, by the exponent difference logic 595 and the normalization logic 570 may be a left shifter also controlled, at least in part, by the exponent difference logic 595.

In one embodiment, the apparatus 500 may also include a renormalization logic 580 to selectively normalize the digital representation of the first rounded floating point result into a digital representation of a final rounded floating point result. In one embodiment, the renormalization logic 580 may be a rounding logic. After normalization and selective renormalization, the final rounded floating point result is provided as an integer rounded version of the original floating point number.

In one embodiment, the apparatus 500 may also include an adder bypass pre-multiplexer 590 to selectively provide the original floating point number provided on input signal lines 520 when the alignment logic 510 detects an integer overflow condition. In one embodiment, if an integer overflow condition is encountered, the apparatus 500 will output the unchanged floating point data as its result. For example, if the Src1 exponent is greater than or equal to a Src2 exponent, where Src1 was provided as a first input (e.g., number to round) and where Src2 was provided as a second input (e.g., value to facilitate rounding), then adder bypass pre-multiplexer 590 and/or adder bypass logic 560 may be controlled to select an unaligned version of the values provided on input signal lines 520 and to disable normalization and rounding so that the original floating point value is provided as the result. It is to be appreciated that in some embodiments the function performed by the adder bypass pre-multiplexer 590 may be performed in other logics (e.g., renormalization logic 580).

If the Src1 exponent is less than the Src2 exponent, then the difference between the two exponents may be used to control right shifting of the Src1 mantissa using alignment multiplexers (e.g., alignment logic 510). The least significant bit of the integer may be positioned as bit 3 of the mantissa to facilitate a logical OR into the sticky bit of the bits that are right shifted off the Src1 mantissa during alignment. Alignment bits like the least significant bit (L), guard bit (G) and round bit (R) may, along with the sticky bit, determine whether rounding up will occur and thus control whether a rounded-up version (+1) or a non-rounded-up version (+0) will be processed. The following chart details logic for one embodiment for determining whether to round up:

| Mode | Sticky = 0 | Sticky = 1 |
|---|---|---|
| Truncate | 0 | 0 |
| Down | Sign(G + R) | Sign |
| Nearest Integer | G(L + R) | G |
| Up | Sign#(G + R) | Sign# |

The rounding mode may be determined, for example, by bits 1:0 of a value that is provided to the floating point adder 500 as an argument in an instruction. While the mantissa adder 540 is computing the rounded-up mantissa, the determination concerning whether to round up can be performed in parallel by the adder bypass logic 560 and/or the adder bypass pre-multiplexer 590. When the Src1 exponent is greater than the Src2 exponent, the adder bypass logic 560 will select between the rounded-up version of the aligned Src1 mantissa and the non-aligned version of the mantissa. In one embodiment, the adder bypass logic 560 may also zero out bits to the right of the least significant bit in the integer to avoid having bits shifted back into the mantissa when the integer is normalized into a floating point format.

Figure 6:
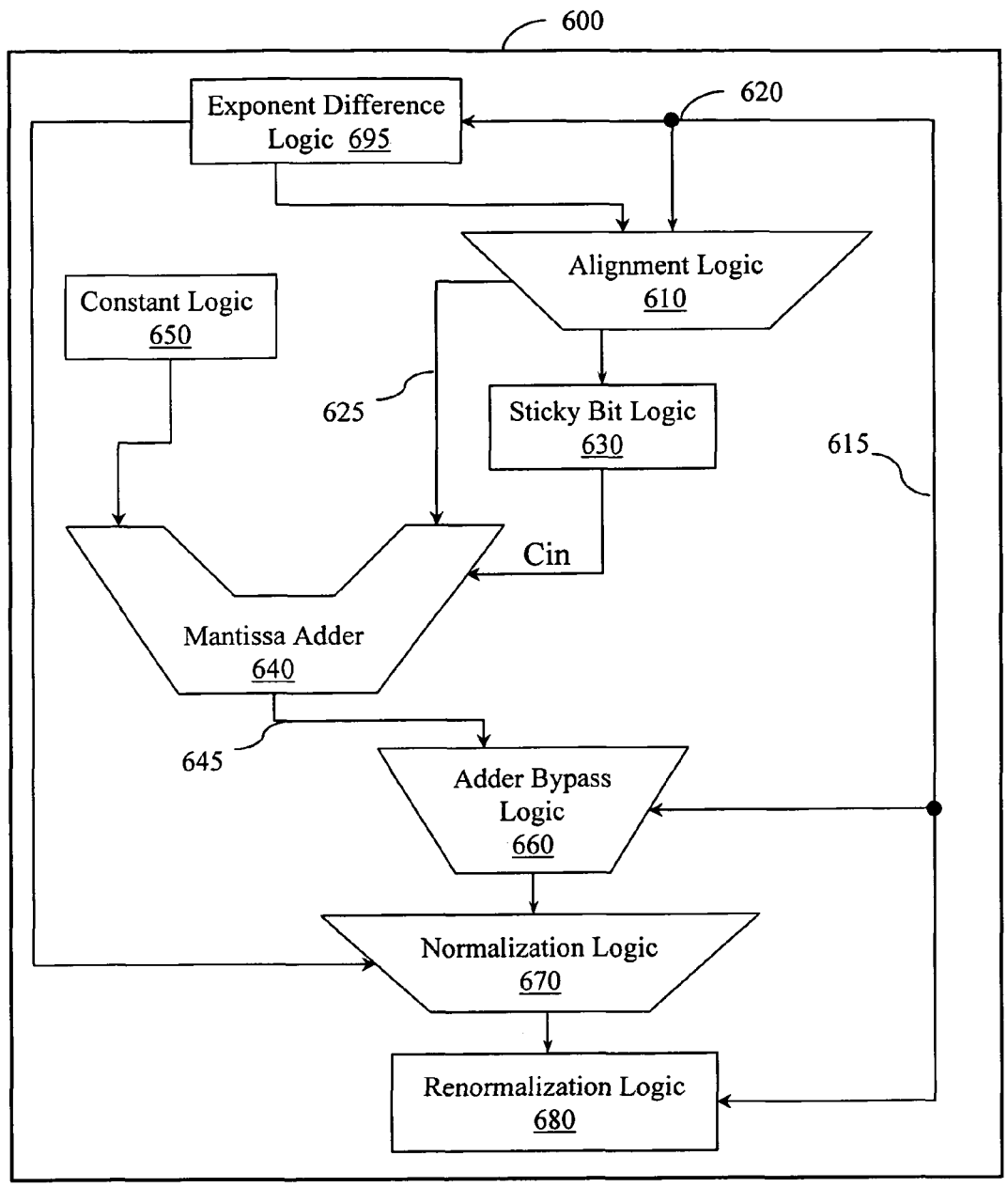
FIG. 6 illustrates processing logic in which at least some aspects of at least one embodiment of the invention may be performed.

FIG. 6 illustrates processing logic in which at least some aspects of at least one embodiment of the invention may be performed. The processing logic may be arranged in an apparatus 600 according to one embodiment of the invention. In one embodiment, apparatus 600 includes some elements similar to those described in connection with the apparatus 500 (FIG. 5). For example, the apparatus 600 includes an alignment logic 610, a sticky bit logic 630, a mantissa adder 640, an adder bypass logic 660, an exponent difference logic 695, a normalization logic 670, and a renormalization logic 680. Signal lines 615 may carry the original input value. Signal lines 625 may carry a first integer produced by alignment logic 610. Signal lines 645 may carry the updated integer produced by the mantissa adder 640.

Apparatus 600 illustrates an embodiment of the invention having at least one different coupling of elements. For example, in the apparatus 600, the sticky bit logic 630 is coupled to the mantissa adder 640 by a carry in line (e.g., Cin). Thus, an adder bypass pre-multiplexer (e.g., 590, FIG. 5), may be excluded. Additionally, depending on where a designer determines to perform output selection, adder bypass logic 660 may even be excluded. In one embodiment, the apparatus 600 may also include a constant logic 650 to provide a constant to the mantissa adder 640. The constant may be added to the digital representation of the integer number to produce the digital representation of the updated integer number. In one embodiment, the constant will be an integer one.

In one embodiment, the apparatus 600 may provide the final rounded floating point result in one operation (e.g., uop). In one embodiment, the one micro-operation performance is possible due, at least in part, to partially parallel processing performed in the apparatus 600. The partially parallel processing is facilitated by how components are coupled. For example, the exponent difference logic 695, the alignment logic 610, the mantissa adder 640, and the renormalization logic 680 may be coupled in a first circuit path. Additionally, the mantissa adder 640, the normalization logic 670, and the renormalization logic 680 may be coupled in a second circuit path.

In one embodiment, the apparatus 600 includes a multiplexer to choose between selects for left shifting multiplexers (e.g., normalization logic 670, renormalization logic 680). The selects may include an encoded output and a right shift encoded value. In one embodiment, a pre-multiplexer (e.g., adder bypass pre-multiplexer 590 (FIG. 5)) may be added to the design of a pre-existing floating point add unit to facilitate forcing a normalization shift of zero for the Src1>Src2 case. This will normalize the mantissa except when the mantissa adder 640 rounds up and the round up bit carries all the way up to the overflow bit. In this case, an additional right shift of 1 bit is performed. In this case, the Src1 exponent will also be incremented. In one embodiment, a rounding logic (e.g., renormalization logic 680) will produce both +0 and +2 values for the Src1 exponent. When the right shift of one bit is performed the round logic will examine the least significant bit of the exponent and will choose one of the two results while toggling the least significant bit to give a +1 result.

In one embodiment, adder bypass logic 660 may be excluded or incorporated into another logic if lines 615 are connected to renormalization logic 680 and if renormalization logic 680 selects between rounded values and the original input value. Thus it is to be appreciated that adder bypass logic 660 may be a separate component as illustrated or may be included in another element (e.g., renormalization logic 680).

Figure 7:
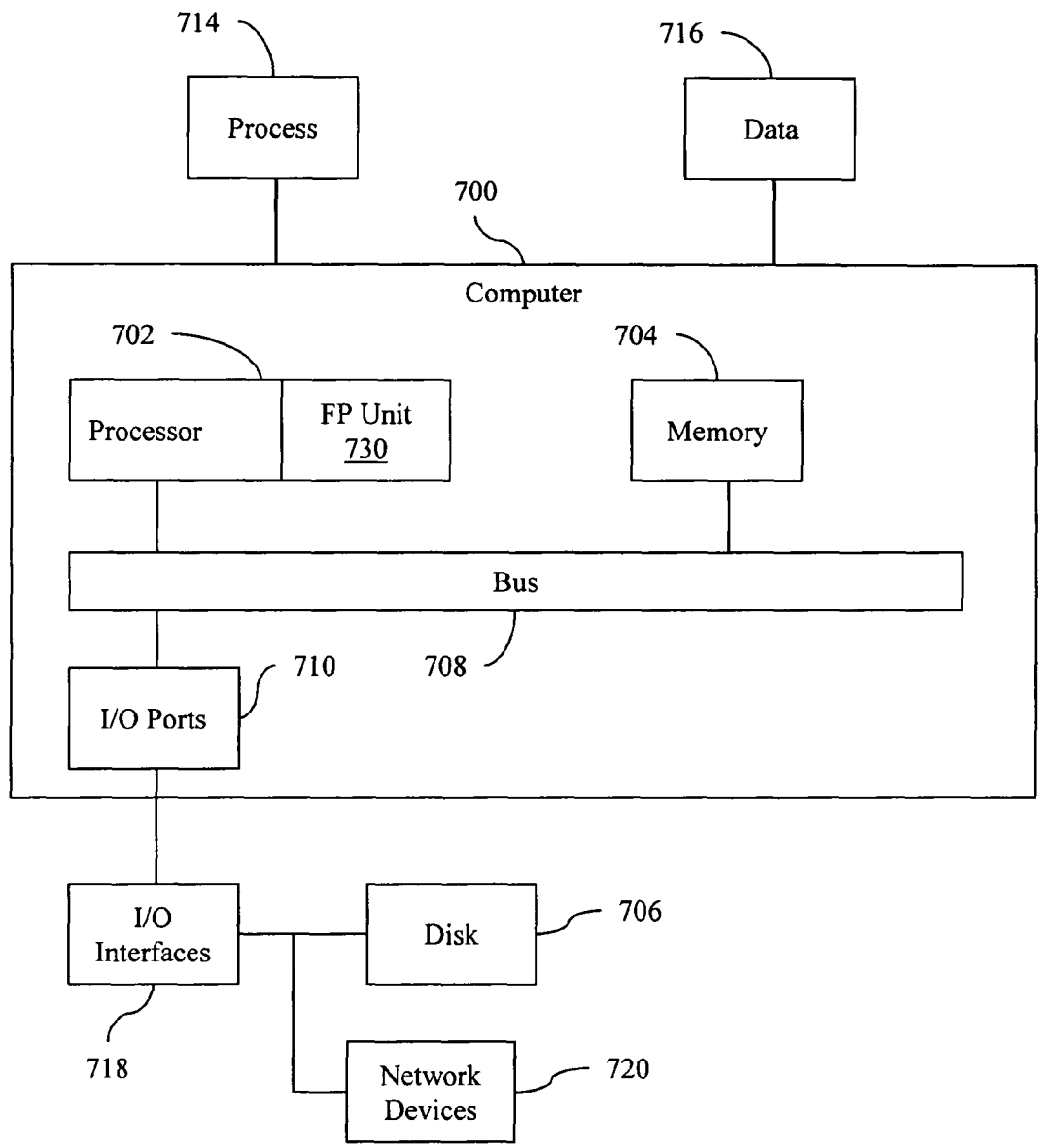
FIG. 7 illustrates a computer system in which various embodiments of the invention may be used.

FIG. 7 illustrates a computer system in which various embodiments of the invention may by used. The example computing system may include a computer 700 that includes a processor 702, a memory 704, and input/output ports 710 connected by a bus 708. In one embodiment, processor 702 may include a floating point unit 730 to integer round floating point numbers in one operation (e.g., uop). In different embodiments, the floating point unit 730 may be implemented similar to previously described embodiments (e.g., integrated circuit 100, floating point arithmetic logic 300, floating point arithmetic logic 400, apparatus 500, apparatus 600).

In one embodiment, floating point unit 730 may include a right shift alignment logic to right shift a floating point number into an integer number. Floating point unit 730 may also include a digit loss logic to establish a value for a digit loss bit. The digit loss bit holds a value that represents a digit loss condition created by the right shift alignment logic. In one embodiment, floating point unit 730 may also include an adder to add an integer one to the integer number produced by the alignment logic. This "add one" version of the integer number may be referred to as a speculatively rounded integer number. Thus, two integer numbers are internally available to the floating point unit 730.

Therefore, in one embodiment, floating point unit 730 may also include an adder bypass multiplexer to select one of the integer number and the speculatively rounded integer number as an intermediate integer number. Which number is selected may be based, at least in part, on a rounding mode and the value for the digit loss bit. The selecting may be performed at least partially in parallel with the adder producing the speculatively rounded integer number. The selected integer number may then be left shifted (e.g., normalized) back into a floating point number. Therefore, in one embodiment, floating point unit 730 may also include a left shifting normalization logic to normalize the intermediate integer number into a first rounded floating point result. Since both the right shift alignment logic and the left shift normalization logic may shift a number by the same number of bits, the first rounded floating point number may need to be further normalized if a carry condition was created by the adder. Therefore, in one embodiment, floating point unit 730 may include a renormalization logic to selectively normalize the first rounded floating point result into a final rounded floating point result. When the floating point unit has finished the rounding, the final rounded floating point result will be an integer rounded version of a received floating point number.

Generally describing an example configuration of computer 700, processor 702 may be a variety of various processors including dual microprocessor and other multi-processor architectures. Memory 704 may include volatile memory and/or non-volatile memory. Non-volatile memory may include, for example, ROM (Read Only Memory), PROM (Programmable ROM), EPROM (Erasable PROM), and EEPROM (Electrically Erasable PROM). Volatile memory may include, for example, RAM (Random Access Memory), synchronous RAM (SRAM), dynamic RAM (DRAM), synchronous DRAM (SDRAM), double data rate SDRAM (DDR SDRAM), and direct RAMbus RAM (DRRAM).

Disk 706 may be connected to computer 700 via, for example, an input/output interface (e.g., card, device) 718 and an input/output port 710. Disk 706 may be, for example, a magnetic disk drive, a solid state disk drive, a floppy disk drive, a tape drive, a Zip drive, a flash memory card, and/or a memory stick. Furthermore, disk 706 may be a CD-ROM (Compact Disk ROM), a CD recordable drive (CD-R drive), a CD rewriteable drive (CD-RW drive), and/or a digital video ROM drive (DVD ROM). Memory 704 can store a process 714 and/or data 716, for example. Disk 706 and/or memory 704 can store an operating system that controls and allocates resources of computer 700.

Bus 708 may be a single internal bus interconnect architecture and/or other bus or mesh architectures. While a single bus is illustrated, it is to be appreciated that computer 700 may communicate with various devices, logics, and peripherals using other busses (e.g., Infiniband, 1394, USB (Universal Serial Bus), Ethernet). Bus 708 can be types including, for example, a memory bus, a memory controller, a peripheral bus, an external bus, a crossbar switch, and/or a local bus. The local bus may be, for example, an industrial standard architecture (ISA) bus, a microchannel architecture (MSA) bus, an extended ISA (EISA) bus, a peripheral component interconnect (PCI) bus, a PCIE (PCI Express) bus, a universal serial (USB) bus, and a small computer systems interface (SCSI) bus.

Computer 700 may interact with input/output devices via i/o interfaces 718 and input/output ports 710. Input/output devices may be, for example, a keyboard, a microphone, a pointing and selection device, cameras, video cards, displays, audio cards, speakers, disk 706, network devices 720, and so on. Input/output ports 710 may include, for example, serial ports, parallel ports, and USB ports.

Computer 700 can operate in a network environment and thus may be connected to network devices 720 via i/o interfaces 718, and/or i/o ports 710. Through the network devices 720, computer 700 may interact with a network. Through the network, computer 700 may be logically connected to remote computers. Networks with which computer 700 may interact include, but are not limited to, a local area network (LAN), a wide area network (WAN), and other networks. In different examples, network devices 720 may connect to LAN technologies including, for example, fiber distributed data interface (FDDI), copper distributed data interface (CDDI), Ethernet, token ring, and wireless computer communication. Similarly, network devices 720 may connect to WAN technologies including, for example, point to point links, circuit switching networks (e.g., integrated services digital networks (ISDN)), packet switching networks, and digital subscriber lines (DSL).

Figure 8:
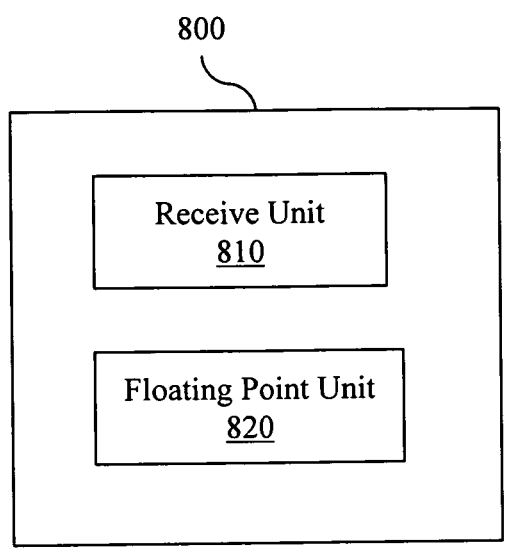
FIG. 8 illustrates some features of a processor in which one embodiment of the invention may be used.

FIG. 8 illustrates some features of a processor 800 in which one embodiment of the invention may be used. In one embodiment, the processor 800 may include a unit 810 to receive a floating point number to round. Unit 810 may be, for example, a set of input lines, a register, a bus interface, and so on. Processor 800 may also include a floating point unit 820 to integer round the floating point number in response to one micro-operation (uop).

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations (e.g., changing state) of physical quantities (e.g., voltage, polarity). The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor (DSP) circuit, an application specific integrated circuit (ASIC)), or other logic device. Blocks may represent executable instructions that cause a computer, processor, and/or logic device to respond, to perform an action(s), to change states, and/or to make decisions. It will be appreciated that electronic and software applications may involve dynamic and flexible processes and therefore illustrated blocks can be performed in other sequences different than the one shown and/or blocks may be combined or separated into multiple components. In some examples, blocks may be performed concurrently, substantially in parallel, and/or at substantially different points in time.

Figure 9:
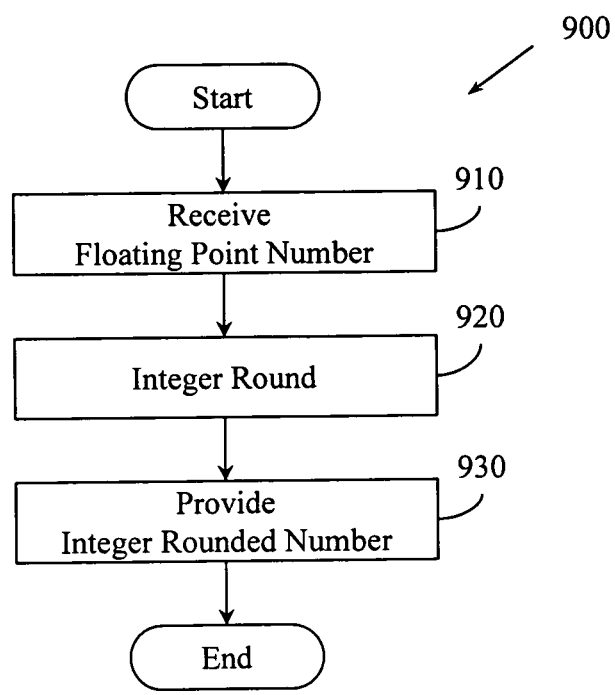
FIG. 9 is a flow chart illustrating operations used in one embodiment of the invention.

FIG. 9 is a flow chart illustrating operations used in one embodiment of the invention. Operations in method 900 may be used to integer round a floating point number. At operation 910, a floating point number to be integer rounded may be received. In one embodiment the floating point number may be received on a bus. Additionally, an instruction to integer round the floating point number may be received on the bus. At operation 920, the floating point number may be integer rounded. In one embodiment the floating point number may be integer rounded in response to a single operation (e.g., uop). At operation 930, the integer rounded number may be provided. In one embodiment, the floating point number may be provided on a bus.

Figure 10:
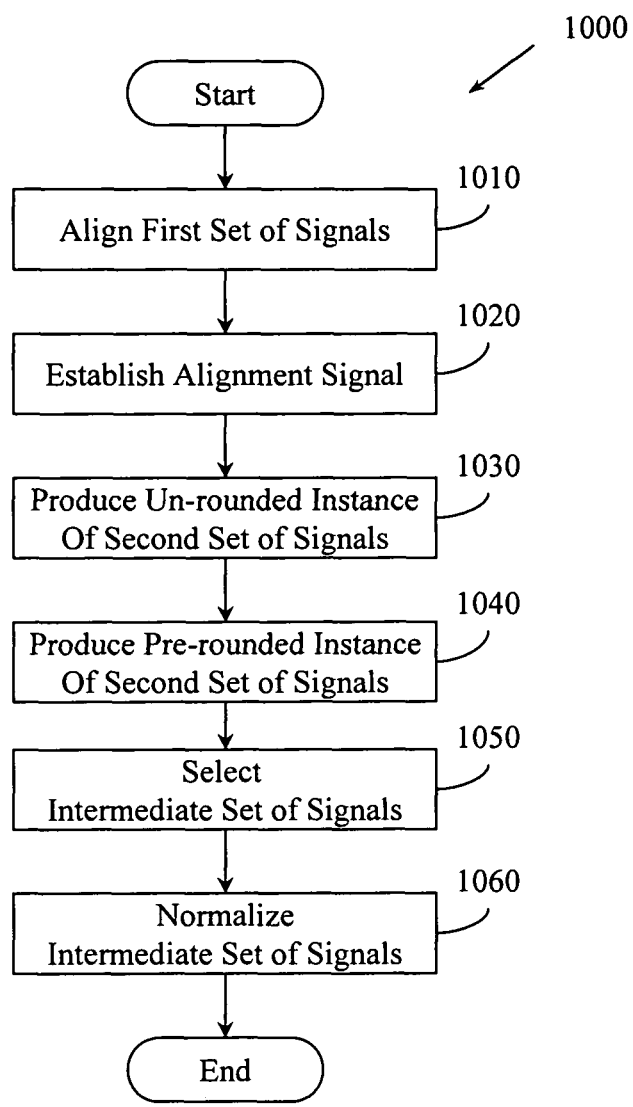
FIG. 10 is a flow chart illustrating operations used in one embodiment of the invention.

FIG. 10 is a flow chart illustrating operations used in one embodiment of the invention. Operations in method 1000 may be used to integer round a floating point number. At operation 1010, members of a first set of signals are aligned to create a second set of signals. In one embodiment, digits in a floating point mantissa are shifted so that all non-zero values of the mantissa appear in an integer mantissa.

At operation 1020, an alignment signal based on the aligning performed at 1010 may be established. The alignment signal may indicate whether bits were lost during the aligning of operation 1010. In one embodiment, the alignment signal may be the bitwise OR of bits shifted out of the first set of signals during alignment.

At operation 1030, an ungrounded instance of the second set of signals may be produced. The un-rounded instance may be, for example, a rounded-down version. At operation 1040, a second instance of the second set of signals may be produced. The second instance may be a pre-rounded version of the integer value. The pre-rounded version may be, for example, a rounded-up version. Thus, the first instance of the second set of signals may represent an ungrounded number while the second instance of the second set of signals may represent a pre-rounded number.

At operation 1050, an intermediate set of signals may be selected from the two instances of the second set of signals. The selection may be based, at least in part, on the alignment signal and a rounding mode signal. The rounding mode signal may indicate, for example, a rounding mode (e.g., truncate, towards zero, towards positive infinity, towards negative infinity).

At operation 1060, the intermediate set of signals may be normalized into a third set of signals that represent an integer rounded version of the floating point value. In one embodiment, both the first set of signals and the third set of signals may conform to the IEEE 754 floating point standard. In other embodiments, the first set of signals and third set of signals may conform to other floating point standard(s).

In one embodiment, aligning members of the first set of signals in operation 1010 includes right shifting the first set of signals by a number of bits determined by an exponent associated with the floating point value. In this embodiment, normalizing the intermediate set of signals at operation 1060 includes left shifting the intermediate set of signals by the same number of bits.

Pre-rounding performed at operation 1040 and selecting performed at operation 1050 are illustrated as being performed serially. However, in one embodiment, the pre-rounding performed at operation 1040 may be performed at least partially in parallel with determining which instance of the second set of signals will be selected as the intermediate set of signals at operation 1050. In one embodiment, method 1000 may be performed in one micro-operation.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A microprocessor for a computer system including a floating point arithmetic logic, the floating point arithmetic logic responsive to a packed integer rounding instruction and comprising:

a first unit to convert an input floating point number, of a plurality of packed floating point numbers of an argument of the packed integer rounding instruction, to a first integer number and to manipulate a conversion signal state;

a second unit to add a value to the first integer number to produce a second integer number;

a third unit to select a result integer from the first integer number and the second integer number based, at least in part, on an input rounding mode provided by an immediate field of the packed integer rounding instruction and the conversion signal state;

a fourth unit to process the result integer into an output floating point number, the output floating point number being an integer rounded version of the input floating point number, the output floating point number being produced from the input floating point number in a single pass through the floating point arithmetic logic and in response to a single micro-operation decoded from the packed integer rounding instruction; and a fifth unit to provide the input floating point number as an output floating point number in response to an integer overflow condition generated by the first unit, wherein a second argument of number is to be provided to the floating point arithmetic logic in response to the instruction is to be to be used to detect the integer overflow condition.

2. The microprocessor of claim 1, where the second unit is to add in parallel with the third unit selection.

3. The microprocessor of claim 1, the first unit comprising an alignment logic, the second unit comprising an adder, where the conversion signal state is to include one or more of, a guard bit state, a round bit state, a sticky bit state, and a least significant bit state, and where the value to be added to the first integer number is an integer one.

4. The microprocessor of claim 3, the third unit comprising an adder bypass multiplexer to select the result integer based, at least in part, on the input rounding mode, the guard bit state, the round bit state, the sticky bit state, and the least significant bit state.

5. The microprocessor of claim 4, the fourth unit comprising:
   a normalization logic to normalize the result integer into the output floating point number; and
   a rounding logic to renormalize the output floating point number.

6. The microprocessor of claim 1, wherein the fifth unit is to comprise an adder bypass pre-multiplexer and wherein the fifth unit is to provide the input floating point number as the output floating point number in response to a determination that an exponent of the input floating point number is larger or equal to an exponent of the input rounding mode.

7. The microprocessor of claim 1, wherein the integer overflow condition is to be detected based on a comparison of an exponent of the input floating point number and a second exponent that is to be used to facilitate integer rounding.

8. The microprocessor of claim 1, wherein the integrated circuit includes audio logic to control an audio device to produce a sound based on the output floating point number.

9. A computer system, comprising:
   a memory to store a packed integer rounding floating point instruction having an immediate field to provide a rounding mode; and
   a processor to execute the packed integer rounding floating point instruction, the processor being coupled to the memory, the processor including a floating point arithmetic logic to integer round a floating point value, corresponding to the packed integer rounding floating point instruction, in response to a single micro-operation decoded from the packed integer rounding floating point instruction, and in only one pass through the floating point arithmetic logic, and based on the rounding mode provided by the immediate field of the packed integer rounding floating point instruction, wherein the floating point value is to be provided as an output floating point number in response to an integer overflow condition to be detected based on a number provided to the floating point arithmetic logic responsive to the packed integer rounding floating point instruction;
   a video card coupled to the processor through an input/output port, and
   an audio device coupled to the processor, wherein the processor includes an audio logic to control the audio device to produce a sound based, at least in part, on the output floating point number.

10. The computer system of claim 9, the floating point arithmetic logic comprising:
   a float-to-integer circuit to transition a received floating point value to a first integer value;
   an adder logic to round up the first integer value to produce a second integer value;
   a selection logic to choose one of the first integer value and the second integer value as a result integer value; and
   an integer-to-float circuit to transition the result integer value to a result floating point value, the result floating point value being a rounded version of the received floating point value.

11. The computer system of claim 9, wherein the integer overflow condition is to be detected based on a comparison of an exponent of the floating point value and a second exponent provided, wherein the second exponent is to be based on a difference between a J-bit position and an integer least significant bit position.

12. The computer system of claim 9, wherein the processor is to integer round the floating point value in response to a single operation corresponding to the packed integer rounding floating point instruction.

13. The computer system of claim 9, wherein the processor comprises a main processor of the computer system.

14. A microprocessor for a computer system, the microprocessor including a floating point arithmetic logic, the floating point arithmetic logic responsive to a packed integer rounding instruction and comprising:
   an alignment logic circuitry to align a digital representation of an original floating point number, of a plurality of packed original floating point numbers indicated by the packed integer rounding instruction, into a digital representation of an integer number;
   a sticky bit logic circuitry to establish a value for a sticky bit;
   a mantissa adder to produce a digital representation of an updated integer number from the digital representation of the integer number;
   an adder bypass logic circuitry to select one of the digital representation of the integer number and the digital representation of the updated integer number as a digital representation of a rounded integer number, the selection being based, at least in part, on a rounding mode provided by an immediate field of the packed integer rounding instruction and the sticky bit;
   a normalization logic circuitry to normalize the digital representation of the rounded integer number into a digital representation of a first rounded floating point result; and
   a renormalization logic circuitry to normalize the digital representation of the first rounded floating point result into a digital representation of a final rounded floating point result, the final rounded floating point result being an integer rounded version of the original floating point number, where the final rounded floating point result is to be generated in a single pass through the floating point arithmetic logic and in response to a single micro-operation decoded from the packed integer rounding instruction,
   wherein the original floating point number is to be provided as an output floating point number in response to an integer overflow condition, wherein the integer overflow condition is to be detected based on a comparison of an exponent of the original floating point number and a second exponent provided to the floating point arithmetic logic by an argument of the packed integer rounding instruction.

15. The microprocessor of claim 14, the sticky bit to indicate whether a bit loss is associated with the alignment of the digital representation of the original floating point number into the digital representation of the integer number.

16. The microprocessor of claim 14, where the mantissa adder and the adder bypass logic circuitry are to operate in parallel.

17. The microprocessor of claim 14, including a constant logic to provide a constant to the mantissa adder, the constant to be added to the digital representation of the integer number to produce the digital representation of the updated integer number.

18. The microprocessor of claim 14, including an adder bypass pre-multiplexer to provide the original floating point number in response to an integer overflow condition in the alignment logic circuitry.

19. A processor, comprising:
a unit to receive a plurality of packed floating point numbers including an input floating point number to round, the plurality of packed floating point numbers indicated by a packed instruction; and
a floating point unit to integer round the input floating point number based on a rounding mode provided by an immediate field of the packed instruction in a single pass through the floating point unit, and in response to a single micro-operation decoded from the packed instruction, wherein the input floating point number is to be provided as an output floating point number in response to an integer overflow condition, and wherein the integer overflow condition is to be detected based on a comparison of an exponent of the input floating point number and a second exponent provided to the floating point unit as an argument of the packed instruction, wherein the second exponent is to be forced with a constant that is a difference between a J-bit position and an integer least significant bit position.

20. The processor of claim 19, the floating point unit comprising:
a right shift alignment logic to right shift the input floating point number into an integer number;
a digit loss logic to establish a value for a digit loss bit to represent a digit loss condition created by the right shift alignment logic;
an adder to add an integer one to the integer number to produce a speculatively rounded integer number;
an adder bypass multiplexer to select one of the integer number and the speculatively rounded integer number as an intermediate integer number;
a left shift normalization logic to left shift the intermediate integer number into a first rounded floating point result; and
a renormalization logic to normalize the first rounded floating point result into a final rounded floating point result, the final rounded floating point result being an integer rounded version of the input floating point number.

21. The processor of claim 20, the adder bypass multiplexer selection being based, at least in part, on the input rounding mode and the value for the digit loss bit, the adder bypass multiplexer and the adder being coupled to the right shift alignment logic.

22. The processor of claim 20, where the adder bypass multiplexer can perform the selection at least partially in parallel with production of the speculatively rounded integer number by the adder.

23. The processor of claim 19, wherein the processor includes logic to interface with an input/output device that is operable to couple different types of input/output devices including an audio device and a video card.

24. A computer-executable method, comprising:
receiving at a microprocessor of a computer system a packed integer round floating point instruction, the packed integer round floating point instruction indicating a source having a plurality of packed floating point numbers and having an immediate field that provides a rounding mode;
receiving an input floating point number to integer round, the input floating point number of the plurality of packed floating point numbers;
integer rounding the input floating point number to a result floating point number based on the rounding mode provided by the immediate field of the packed integer round floating point instruction; and
storing the result floating point number in one selected from a register and a memory, wherein the integer rounding and the storing the result floating point number are to be performed via a single pass through a floating point arithmetic logic and in response to a single micro-operation corresponding to the packed integer round floating point instruction, wherein the input floating point number is to be provided as the result floating point number in response to an integer overflow condition detected based on a number provided to the floating point arithmetic logic in response to the packed integer round floating point instruction; and
controlling an audio device to produce a sound based, at least in part, on the result floating point number.

25. The method of claim 24, where integer rounding the floating point number comprises:
aligning one or more members of a first set of signals that represent the input floating point number to create a second set of signals that represent an integer value;
establishing an alignment signal based on the aligning;
establishing a first instance of a second set of signals as an un-rounded version of the integer value;
manipulating a second instance of the second set of signals into a pre-rounded version of the integer value;
selecting an intermediate set of signals from the first instance of the second set of signals and the second instance of the second set of signals based, at least in part, on the alignment signal and a rounding mode signal, and normalizing the intermediate set of signals into a third set of signals that represent an integer rounded version of the input floating point value.

26. The method of claim 24, wherein the integer overflow condition is to be detected based on a comparison of an exponent of the input floating point number and a second exponent associated with the instruction.

* * * * *